United States Patent
Biyani et al.

(10) Patent No.: US 10,301,533 B2
(45) Date of Patent: May 28, 2019

(54) IN SITU GENERATION OF PH CONTROL AGENTS

(71) Applicant: Halliburton Energy Services, Inc., Houston, TX (US)

(72) Inventors: Mahesh Vijaykumar Biyani, Maharashtra (IN); Loan Vo, Houston, TX (US); Jeremy Holtsclaw, Kingwood, TX (US); Raed Rahal, Al-khobar (SA); Monica Rajendra Dandawate, Maharashtra (IN)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/781,392

(22) PCT Filed: Feb. 3, 2016

(86) PCT No.: PCT/US2016/016407
§ 371 (c)(1),
(2) Date: Jun. 4, 2018

(87) PCT Pub. No.: WO2017/135943
PCT Pub. Date: Aug. 10, 2017

(65) Prior Publication Data
US 2018/0362839 A1 Dec. 20, 2018

Related U.S. Application Data (63) Continuation of application No. PCT/US2016/016407, filed on Feb. 3, 2016.

(51) Int. Cl.
*C09K 8/68* (2006.01)
*C09K 8/66* (2006.01)
(Continued)

(52) U.S. Cl.
CPC ............... *C09K 8/685* (2013.01); *C09K 8/54* (2013.01); *C09K 8/602* (2013.01); *C09K 8/66* (2013.01);
(Continued)

(58) Field of Classification Search
CPC ........ C09K 8/685; C09K 8/512; C09K 8/887; C09K 2208/26; C09K 2208/30; E21B 43/26; E21B 43/267
See application file for complete search history.

(56) References Cited

U.S. PATENT DOCUMENTS

| 5,972,850 A | 10/1999 | Nimerick |
| 6,737,386 B1 | 5/2004 | Moorhouse et al. |

(Continued)

FOREIGN PATENT DOCUMENTS

| EP | 1243750 A2 | 9/2002 |
| WO | 2014/209882 A1 | 12/2014 |

OTHER PUBLICATIONS

International Preliminary Report on Patentability issued in related PCT Application No. PCT/US2016/016407 dated Aug. 16, 2018, 7 pages.
(Continued)

*Primary Examiner* — Zakiya W Bates
(74) *Attorney, Agent, or Firm* — Thomas Rooney; Baker Botts L.L.P.

(57) ABSTRACT

Methods and compositions for treatment fluids that include carbonate and bicarbonate to control pH for use in subterranean treatments are provided. In one embodiment, the methods comprise providing a treatment fluid comprising an aqueous base fluid; a crosslinkable polymer; a crosslinking agent; and an amount of carbonate and an amount of bicarbonate, wherein the molar ratio of the amount of carbonate to the amount of bicarbonate is in the range of from about 1:2.3 to about 1:2.7; and introducing the treatment fluid into a wellbore penetrating at least a portion of a subterranean formation.

20 Claims, 6 Drawing Sheets

(51) Int. Cl.
 *C09K 8/54* (2006.01)
 *E21B 43/26* (2006.01)
 *C09K 8/60* (2006.01)
 *C09K 8/88* (2006.01)
 *C09K 8/90* (2006.01)
 *E21B 43/267* (2006.01)

(52) U.S. Cl.
 CPC ............ *C09K 8/887* (2013.01); *C09K 8/90* (2013.01); *C09K 8/905* (2013.01); *E21B 43/26* (2013.01); *C09K 2208/26* (2013.01); *C09K 2208/30* (2013.01); *E21B 43/267* (2013.01)

(56) References Cited

U.S. PATENT DOCUMENTS

| | | |
|---|---|---|
| 7,345,013 B2 | 3/2008 | Fraser |
| 2006/0189709 A1* | 8/2006 | Fraser .................... C09K 8/685 523/130 |
| 2011/0284225 A1 | 11/2011 | Lord et al. |

OTHER PUBLICATIONS

International Search Report and Written Opinion issued in related PCT Application No. PCT/US2016/016407 dated May 20, 2016, 10 pages.

\* cited by examiner

IN SITU GENERATION OF PH CONTROL AGENTS

CROSS-REFERENCE TO RELATED APPLICATION

The present application is a U.S. National Stage Application of International Application No. PCT/US2016/016407 filed Feb. 3, 2016, which is incorporated herein by reference in its entirety for all purposes.

BACKGROUND

The present disclosure relates to systems and methods for treating subterranean formations, and more specifically, methods and compositions for controlling pH levels in treatment fluids used in subterranean operations.

Treatment fluids can be used in a variety of subterranean treatment operations. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid. Illustrative treatment operations can include, for example, fracturing operations, gravel packing operations, acidizing operations, scale dissolution and removal, consolidation operations, and the like. In hydraulic fracturing operations, a viscous treatment fluid (e.g., a "fracturing fluid") is typically pumped at high pressures down into a wellbore to fracture the formation and force fracturing fluid into created fractures in order to enhance or increase the production of oil and gas hydrocarbons from wells bored into subterranean formations. The fracturing fluid is also commonly used to carry sand and other types of particles, called proppants, to hold the fracture open when the pressure is relieved. The fractures, held open by the proppants, provide additional paths for the oil or gas to reach the wellbore, which increases production from the well.

Maintaining sufficient viscosity in the fracturing fluids used in these operations is important for a number of reasons, including but not limited to control of fluid loss into the formation, effective suspension and transport of proppants, and the like. In some instances, various crosslinkable polymers have been added to the aqueous fracturing fluids to viscosify these fracturing fluids. However, the precipitation of divalent ions from the fluid itself or the surrounding subterranean formation can decrease the viscosity and effectiveness of these treatment fluids. The precipitation of divalent ions occurs primarily in specific pH ranges.

BRIEF DESCRIPTION OF THE DRAWINGS

These drawings illustrate certain aspects of some of the embodiments of the present disclosure, and should not be used to limit or define the claims.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

The present disclosure relates to systems and methods for treating subterranean formations. More particularly, the present disclosure relates to treatment fluids that include carbonate and bicarbonate to control pH for use in subterranean treatments.

The present disclosure provides treatment fluids comprising at least an aqueous base fluid, a crosslinkable polymer, a crosslinking agent, and an amount of carbonate and an amount of bicarbonate wherein the molar ratio of carbonate to bicarbonate is in the range of from about 1:2.3 to about 1:2.7, and certain methods of use. In certain embodiments, the methods of the present disclosure comprise: providing a treatment fluid comprising: an aqueous base fluid, a crosslinkable polymer, a crosslinking agent, and an amount of carbonate and an amount of bicarbonate wherein the molar ratio of carbonate to bicarbonate is about 1:2.5 and introducing the treatment fluid into a wellbore penetrating at least a portion of a subterranean formation.

Among the many potential advantages to the methods and compositions of the present disclosure, only some of which are alluded to herein, the methods, compositions, and systems of the present disclosure may, among other benefits, provide for safer, more efficient, and more effective delivery of treatment fluids to a subterranean formation. For example, in certain embodiments, the present disclosure may enhance the stability of aqueous based treatment fluids for use in high temperature applications under high total dissolved salt ("TDS") conditions. In certain embodiments, the present disclosure may provide improved pH control, among other reasons, to better control the precipitation of divalent ions dissolved in the treatment fluid. The reduced precipitation of divalent ions is believed to improve the stability of crosslinked polymers contained in the treatment fluid. Additionally, in certain embodiments, the present disclosure may provide a treatment fluid with improved performance of a zirconium-based crosslinker to produce a more stable crosslinked polymer. In certain embodiments, the methods and compositions of the present disclosure may enable the use of brine solutions as the base for certain treatment fluids without significant pre-treatment of the brine solution.

The treatment fluids used in the methods and systems of the present disclosure may comprise any aqueous base fluid known in the art. The term "base fluid" refers to the major component of the fluid (as opposed to components dissolved and/or suspended therein), and does not indicate any particular condition or property of that fluid such as its mass, amount, pH, etc. Aqueous fluids that may be suitable for use in the methods and systems of the present disclosure may comprise water from any source. Such aqueous fluids may comprise fresh water, salt water (e.g., water containing one or more salts dissolved therein), brine, seawater, or any combination thereof. In many embodiments of the present disclosure, the aqueous fluids comprise one or more ionic species, such as those formed by salts dissolved in water. In certain embodiments, the aqueous base fluid may comprise a TDS value of 3% by weight of the aqueous base fluid or higher, or alternatively, a TDS value of 10% by weight of the aqueous base fluid or higher. For example, seawater and/or produced water (e.g., brine) may comprise a variety of monovalent and divalent cationic species dissolved therein. In certain embodiments, the aqueous fluids comprise seawater, or other sources of saline water, that has been subjected to a water treatment method including, but not limited to, electrocoagulation ("EC"), thermodesalination, reverse osmosis, and nanofiltration ("NF"). In certain embodiments, the density of the aqueous fluid can be adjusted, among other purposes, to provide additional particulate transport and suspension in the compositions of the present disclosure. In certain embodiments, the pH of the aqueous fluid may be adjusted (e.g., by a buffer, the pH control additives of the present disclosure, or other pH adjusting agents) to a specific level, which may depend on, among other factors, the types of viscosifying agents, acids, and other additives included in the fluid. One of ordinary skill in the art, with the benefit of this disclosure, will recognize when such density and/or pH adjustments are appropriate. In certain embodiments, the treatment fluids may comprise a mixture of one or more fluids and/or gases, including but not limited to emulsions, foams, and the like.

The treatment fluids used in the methods and systems of the present disclosure comprise one or more crosslinkable polymers. The term "crosslinkable polymer" as used herein refers to any polymer that under the appropriate conditions (e.g., time, temperature, etc.) is capable of becoming crosslinked (e.g., forming a crosslinked gel). Examples of crosslinkable polymers that may be suitable for the present disclosure include, but are not limited to, polysaccharides composed of mannose and galactose sugars, such as locust bean gum, karaya gum, guar gums, or guar derivatives (e.g., hydroxyethyl guar, hydroxypropyl guar ("HPG"), carboxymethyl guar, carboxymethylhydroxyethyl guar, and carboxymethylhydroxypropyl guar ("CMHPG"), etc.) combinations thereof, and derivatives thereof. Further examples of crosslinkable polymers that may be suitable for the present disclosure include, but are not limited to, cellulose, cellulose derivatives (e.g., hydroxyethyl cellulose, carboxyethylcellulose, carboxymethylcellulose, and carboxymethylhydroxyethylcellulose), biopolymers (e.g., xanthan, scleroglucan, diutan, etc.), starches, chitosans, clays, polyvinyl alcohols, acrylamides, acrylates, viscoelastic surfactants (e.g., methyl ester sulfonates, hydrolyzed keratin, sulfosuccinates, taurates, amine oxides, ethoxylated amides, alkoxylated fatty acids, alkoxylated alcohols, ethoxylated fatty amines, ethoxylated alkyl amines, betaines, modified betaines, alkylamidobetaines, etc.), combinations thereof, and derivatives thereof. The term "derivative" is defined herein to include any compound that is made from one of the listed compounds, for example, by replacing one atom in the listed compound with another atom or group of atoms, rearranging two or more atoms in the listed compound, ionizing the listed compounds, or creating a salt of the listed compound. In certain embodiments, the crosslinkable polymer of the present disclosure may be included in a concentration of from about 30 lb/Mgal of the aqueous base fluid to about 60 lb/Mgal of the aqueous base fluid. A person of skill in the art, with the benefit of this disclosure, will recognize the concentration and amount of crosslinkable polymer to use in a particular embodiment of the present disclosure based on, among other things, the content of the aqueous fluid, the temperature and pH conditions where the treatment fluid will be used, additional additives present in the treatment fluid, and the like.

The treatment fluids used in the methods and systems of the present disclosure also include at least one crosslinking agent to crosslink at least a portion of the molecules of the crosslinkable polymer to form a crosslinked polymer. As used herein, the term "crosslinking agent" includes any molecule, atom, or ion that is capable of forming one or more crosslinks between molecules of the crosslinkable polymer and/or between two or more atoms in a single molecule of the crosslinkable polymer. The term "crosslink" as used herein refers to a covalent or ionic bond that links one polymer chain to another. Generally, the crosslinking agent is present in the treatment fluid in an amount sufficient to provide, inter alia, the desired degree of crosslinking between molecules of the crosslinkable polymers. In certain embodiments, the crosslinking agent may comprise a delayed crosslinking agent, which may be formulated to form crosslinks between polymer molecules after a certain time or under certain conditions (e.g., temperature, pH, etc.).

In certain embodiments, the crosslinking agent used in the methods and systems of the present disclosure may comprise a metal ion that is capable of crosslinking at least two molecules of the crosslinkable polymer. Examples of suitable metal ions include, but are not limited to, zirconium IV ions, titanium ions, aluminum ions, borate ions, and any combination or derivative thereof. These ions may be provided by providing any compound that is capable of producing one or more of these ions; examples of such compounds include, but are not limited to, zirconyl chloride, zirconium sulfate, zirconium lactate, zirconium lactate triethanolamine, zirconium carbonate, zirconium acetylacetonate, zirconium maleate, zirconium citrate, zirconium oxychloride, zirconium diisopropylamine lactate, titanium maleate, titanium citrate, titanium ammonium lactate, titanium triethanolamine, titanium acetylacetonate, aluminum acetate, aluminum lactate, and aluminum citrate. In some embodiments, the crosslinking agent is present in the treatment fluid in a concentration of from about 0.5 gallons per 1000 gallons ("gpt") of the aqueous base fluid to about 3 gpt of the aqueous base fluid. A person of skill in the art, with the benefit of this disclosure, will recognize the concentration and amount of crosslinking agent to use in a particular embodiment of the present disclosure based on, among other things, the temperature conditions of a particular application, the composition of the crosslinkable polymer used, and/or the pH of the treatment fluid.

The treatment fluids used in the methods and systems of the present disclosure include carbonate and bicarbonate ions used to control the pH of the treatment fluid. In certain embodiments, the carbonate and bicarbonate are provided as commercially available salts. Suitable carbonate and bicarbonate salts include, but are not limited to, sodium carbonate, potassium carbonate, sodium bicarbonate, and potassium bicarbonate. These carbonate and bicarbonate salts may be provided in solid form. The solid salts may be mixed with water or other suitable solvents to form a carbonate or bicarbonate solution prior to addition to the treatment fluids of the present disclosure. Alternatively, the solid particles may be added directly to the treatment fluids of the present disclosure. The carbonate and bicarbonate salts may also be provided as pre-mixed liquid solutions. Addition of the carbonate and bicarbonate salts to the treatment fluids of the present disclosure may occur at an offsite staging or storage area. Alternatively, addition of the carbonate and bicarbonate salts to the treatment fluids may occur at a well or drill site.

In certain embodiments, the carbonate and bicarbonate are used such that the molar ratio of the amount of carbonate to the amount of bicarbonate in the treatment fluid is in the range of from about 1:2.3 to about 1:2.7. In certain embodiments, the carbonate and bicarbonate are used such that the molar ratio of the amount of carbonate to the amount of bicarbonate in the treatment fluid is about 1:2.5. It is believed that the bicarbonate acts as a delayed buffering agent and will in situ produce carbonate ions in a controlled manner to help modulate the pH of the treatment fluid. In certain embodiments, the pH value of the treatment fluid may be in the range of from about 8.5 to about 9.5, or alternatively, in the range of from about 8.8 to about 9.2. Without limiting the disclosure to any particular theory or mechanism, it is believed that within these pH ranges, the precipitation of divalent ions, including, but not limited to, calcium ions ($Ca^{2+}$), magnesium ions ($Mg^{2+}$), strontium ions ($Sr^{2+}$), and barium ions ($Ba^{2+}$), with hydroxide and sulfate ions may be minimized. Furthermore, it is believed that this reduction in divalent ion precipitation in turn may enhance the stability of the treatment fluid for high temperature applications. In certain embodiments, the treatment fluids in the methods and systems of the present disclosure may be used in treatment fluids, subterranean formations, and/or well bores at temperatures in the range of from about 250° F. to about 350° F. or higher.

Figure 3:
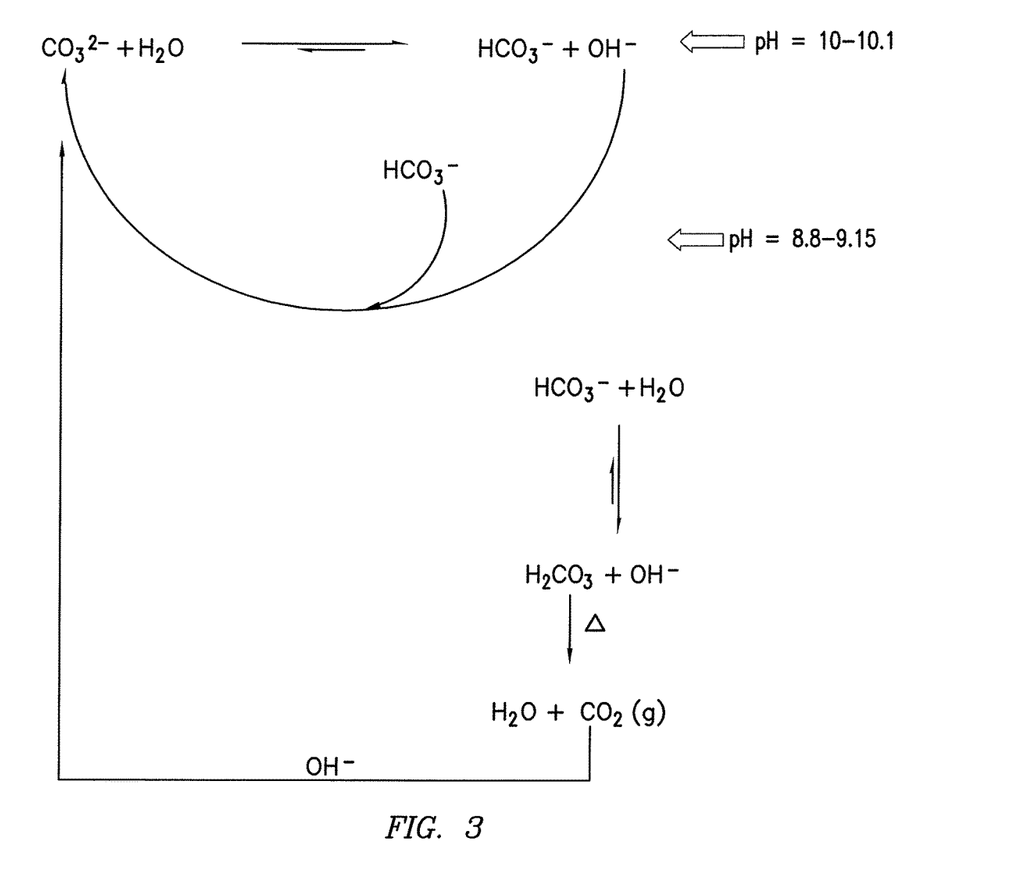
FIG. 3 is a diagram illustrating equilibrium reactions of $CO_3^{2-}$ and $HCO_3^-$ species in accordance with certain embodiments of the present disclosure.
Figure 4A:
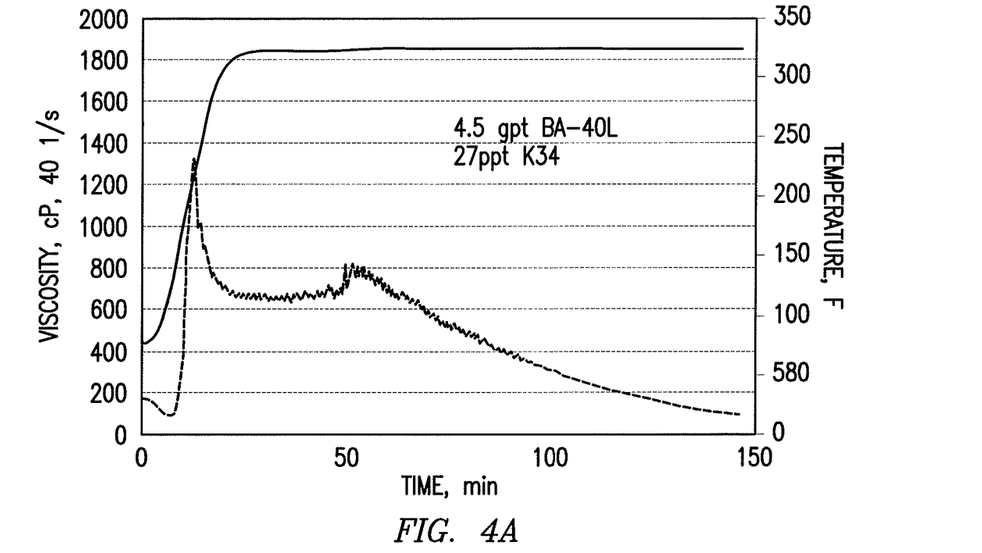
FIGS. 4A, 4B, 4C, and 4D are graphs illustrating data relating to rheological stability of certain treatment fluids of the present disclosure.
Figure 4B:
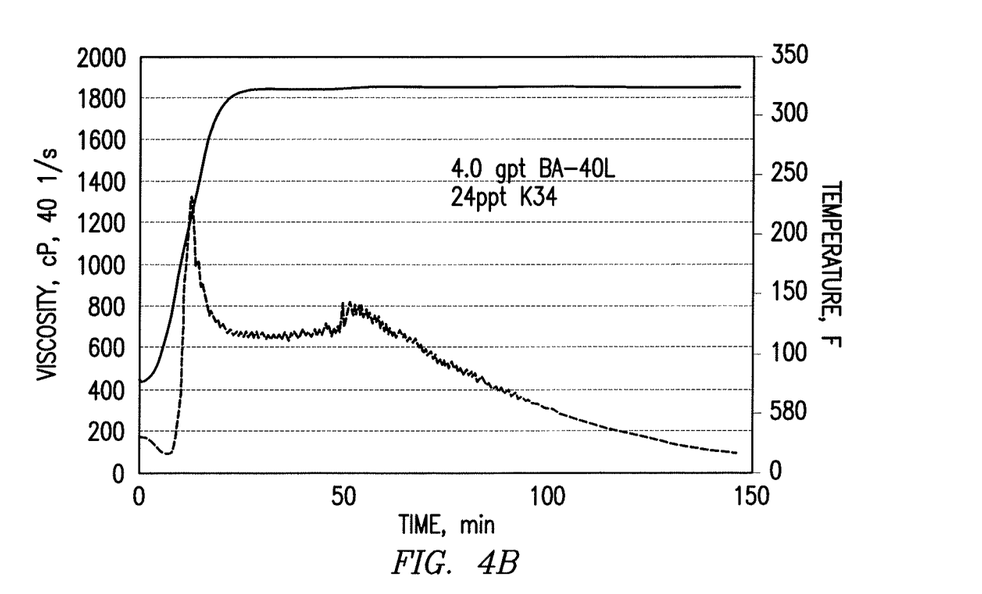
Figure 4C:
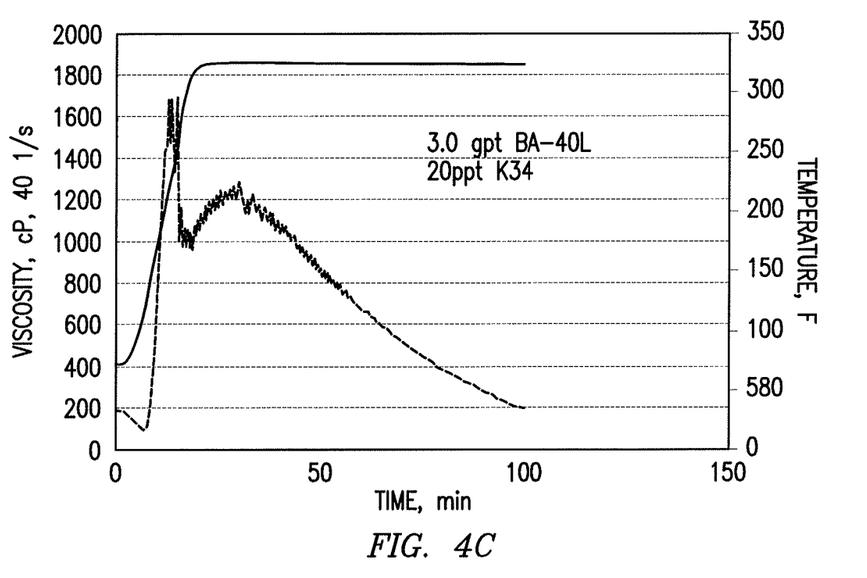
Figure 4D:
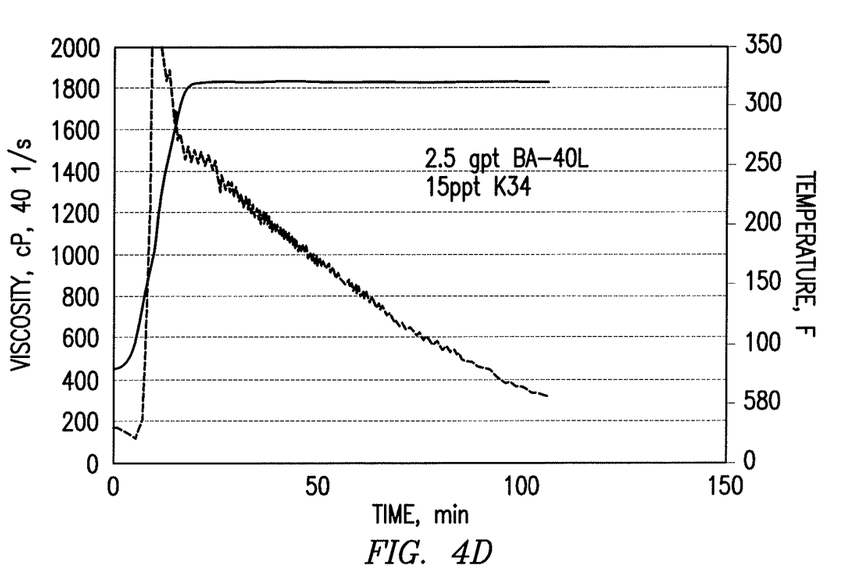

Without limiting the disclosure to any particular theory or mechanism, it is believed that the stoichiometric ratio of carbonate and bicarbonate in the treatment fluid may maintain the pH of the fluid within an appropriate range, as well as for their ability to associate with the crosslinking agent to assist in the stability of the fluid. Referring now to FIG. 3, a schematic representation of the equilibrium reaction of carbonate and bicarbonate is shown. In certain embodiments, this equilibrium ensures that a sufficient amount of carbonate ions remain in solution to maintain the pH within an appropriate range and to coordinate with the crosslinking agent to stabilize the crosslinkable polymer.

In certain embodiments, the treatment fluids used in the methods and systems of the present disclosure also may include a gel stabilizer. Generally, gel stabilizers function to scavenge oxygen from the fluid and to assist in preventing premature fluid degradation. Examples of suitable gel stabilizers include, but are not limited to, oxygen scavenging agents such as thiosulfate and ascorbate salts. In certain embodiments, the gel stabilizer may be present in an amount in the range of from about 10 pounds per 1000 gallons ("pptg") of the aqueous base fluid to about 30 pptg of the aqueous base fluid.

In certain embodiments, the treatment fluids used in the methods and systems of the present disclosure also may include a gel breaker to reduce the viscosity of the treatment fluid. In certain embodiments, the gel breakers may be liquid or encapsulated. In certain embodiments, delayed gel breakers and encapsulated gel breakers that will react with the treatment fluids after desired delay periods may be used. Suitable delayed gel breakers may be materials that are slowly soluble in a treatment fluid. Examples of delayed gel breakers that may be suitable include, but are not limited to, enzyme breakers, such as alpha and beta amylases, amyloglucosidase, invertase, maltase, cellulase, and hemicellulase; and oxidizing agents, such as sodium chlorite, sodium bromate, sodium persulfate, ammonium persulfate, magnesium peroxide, lactose, and triethanol amine activator for persulfates. The gel breakers may cause the viscous treatment fluids to revert to thin fluids that can be produced back to the surface after they have been used, for example, to place proppant particles in subterranean fractures. In certain embodiments, the gel breaker is present as a liquid in the treatment fluid in a concentration of from about 0.1 gpt of the aqueous base fluid to about 5 gpt of the aqueous base fluid. In certain embodiments, the gel breaker may be present as a solid in the treatment fluid in a concentration of from about 0.1 parts per trillion ("ppt") to about 5 ppt.

In certain embodiments, the treatment fluids used in the methods and systems of the present disclosure also may include a clay stabilizer. Generally, clay stabilizers function to create a more evenly treated subterranean formation. Examples of clay stabilizers that may be suitable include, but are not limited to, salt solutions containing, for example, sodium chloride, potassium chloride, or ammonium chloride; cationic polymers and oligomers, for example, poly (dimethyldiallylammonium chloride), cationic poly(acrylamide) and cationic poly (diemethylaminoethylmethacrylate).

In certain embodiments, the treatment fluids used in the methods and systems of the present disclosure also may include a surfactant, among other purposes, to facilitate the flow of the treatment fluid into a subterranean formation. Such surfactants include cationic surfactants, anionic surfactants, zwitterionic surfactants, and non-ionic surfactants, numerous examples of each of which are known to one of ordinary skill in the art. Illustrative examples of surfactants include, but are not limited to, ethoxylated nonyl phenol phosphate esters, alkyl phosphonates, linear alcohols, nonylphenol compounds, alkyoxylated fatty acids, alkylphenol alkoxylates, ethoxylated amides, ethoxylated alkyl amines, betaines, methyl ester sulfonates, hydrolyzed keratin, sulfosuccinates, taurates, amine oxides, alkoxylated fatty acids, alkoxylated alcohols (e.g., lauryl alcohol ethoxylate, ethoxylated nonyl phenol), ethoxylated fatty amines, ethoxylated alkyl amines (e.g., cocoalkylamine ethoxylate), modified betaines, alkylamidobetaines (e.g., cocoamidopropyl betaine) and quaternary ammonium compounds (e.g., trimethyltallowammonium chloride, trimethylcocoammonium chloride). Suitable surfactants can be used in a liquid or powder form.

In certain embodiments, the treatment fluids used in the methods and systems of the present disclosure optionally may comprise any number of additional additives. Examples of such additional additives include, but are not limited to, salts, proppant particulates, diverting agents, fluid loss control additives, gas, nitrogen, carbon dioxide, surface modifying agents, tackifying agents, foamers, corrosion inhibitors, scale inhibitors, catalysts, biocides, friction reducers, antifoam agents, bridging agents, flocculants, $H_2S$ scavengers, $CO_2$ scavengers, additional oxygen scavengers, lubricants, additional viscosifiers, additional breakers, weighting agents, relative permeability modifiers, resins, wetting agents, coating enhancement agents, filter cake removal agents, antifreeze agents (e.g., ethylene glycol), and the like. A person skilled in the art, with the benefit of this disclosure, will recognize the types of additives that may be included in the fluids of the present disclosure for a particular application.

The treatment fluids of the present disclosure may be prepared using any suitable method and/or equipment (e.g., blenders, mixers, stirrers, etc.) known in the art at any time prior to their use. The treatment fluids may be prepared at least in part at a well site or at an offsite location. In certain embodiments, the carbonate and bicarbonate as well as other components of the treatment fluid may be metered directly into a base fluid to form a treatment fluid. In certain embodiments, the base fluid may be mixed with the carbonate and bicarbonate as well as other components of the treatment fluid at a well site where the operation or treatment is conducted, either by batch mixing or continuous ("on-the-fly") mixing. The term "on-the-fly" is used herein to include methods of combining two or more components wherein a flowing stream of one element is continuously introduced into a flowing stream of another component so that the streams are combined and mixed while continuing to flow as a single stream as part of the on-going treatment. Such mixing can also be described as "real-time" mixing. In other embodiments, the treatment fluids of the present disclosure may be prepared, either in whole or in part, at an offsite location and transported to the site where the treatment or operation is conducted. In introducing a treatment fluid of the present disclosure into a portion of a subterranean formation, the components of the treatment fluid may be mixed together at the surface and introduced into the formation together, or one or more components may be introduced into the formation at the surface separately from other components such that the components mix or intermingle in a portion of the formation to form a treatment fluid. In either such case, the treatment fluid is deemed to be introduced into at least a portion of the subterranean formation for purposes of the present disclosure.

In some embodiments, the present disclosure provides methods for using the additives, treatment fluids, and related compounds to carry out a variety of subterranean treatments, including but not limited to hydraulic fracturing treatments and drilling operations. In certain embodiments, a treatment fluid may be introduced into a subterranean formation. In some embodiments, the treatment fluid may be introduced into a wellbore that penetrates a subterranean formation. In some embodiments, the treatment fluid may be introduced at a pressure sufficient to create or enhance one or more fractures within the subterranean formation (e.g., hydraulic fracturing).

Treatment fluids can be used in a variety of subterranean treatment operations. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid. Illustrative treatment operations can include, for example, fracturing operations, gravel packing operations, scale dissolution and removal, consolidation operations, and the like.

Certain embodiments of the methods and compositions disclosed herein may directly or indirectly affect one or more components or pieces of equipment associated with the preparation, delivery, recapture, recycling, reuse, and/or disposal of the disclosed compositions. For example, and with reference to FIG. 1, the disclosed methods and compositions may directly or indirectly affect one or more components or pieces of equipment associated with an exemplary fracturing system 10, according to one or more embodiments. In certain instances, the system 10 includes a fracturing fluid producing apparatus 20, a fluid source 30, a proppant source 40, and a pump and blender system 50 and resides at the surface at a well site where a well 60 is located. In certain instances, the fracturing fluid producing apparatus 20 combines a gel pre-cursor with fluid (e.g., liquid or substantially liquid) from fluid source 30, to produce a hydrated fracturing fluid that is used to fracture the formation. The hydrated fracturing fluid can be a fluid ready for use in a fracture stimulation treatment of the well 60 or a concentrate to which additional fluid is added prior to use in a fracture stimulation of the well 60. In some embodiments, the fracturing fluid producing apparatus 20 can be omitted and the fracturing fluid sourced directly from the fluid source 30. In certain embodiments, the fracturing fluid may comprise water, a hydrocarbon fluid, a polymer gel, foam, air, wet gases and/or other fluids.

Figure 1:
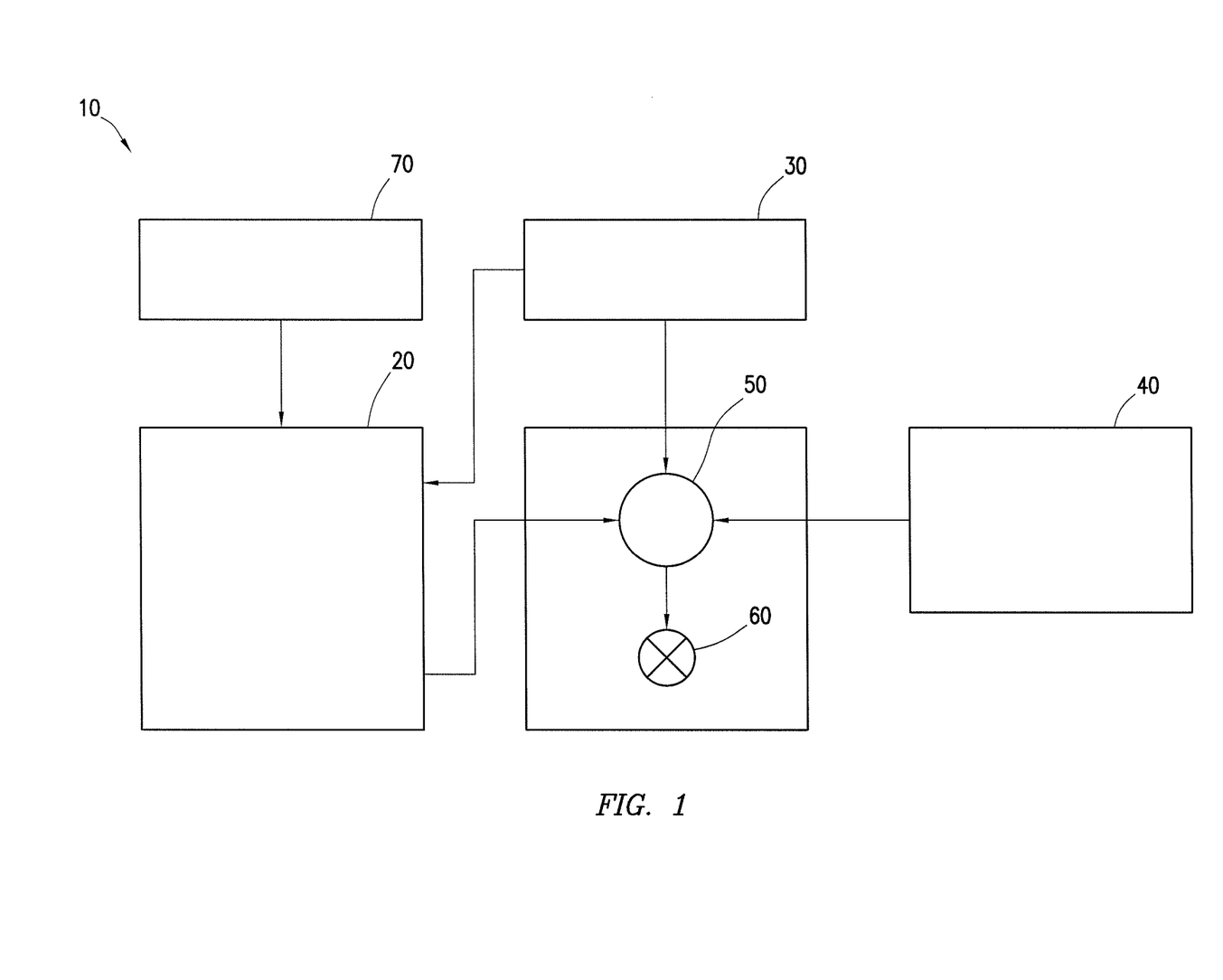
FIG. 1 is a diagram illustrating an example of a fracturing system that may be used in accordance with certain embodiments of the present disclosure.

The proppant source 40 can include a proppant for combination with the fracturing fluid. In certain embodiments, one or more treatment particulates of the present disclosure may be provided in the proppant source 40 and thereby combined with the fracturing fluid with the proppant. The system may also include additive source 70 that provides one or more additives (e.g., carbonate sources, bicarbonate sources, crosslinkable polymers, crosslinking agents, and/or other additives) to alter the properties of the fracturing fluid. For example, the other additives 70 can be included to reduce pumping friction, to reduce or eliminate the fluid's reaction to the geological formation in which the well is formed, to operate as surfactants, and/or to serve other functions. In certain embodiments, the other additives 70 may include carbonate and/or bicarbonate.

The pump and blender system 50 receives the fracturing fluid and combines it with other components, including proppant from the proppant source 40 and/or additional fluid from the additives 70. The resulting mixture may be pumped down the well 60 under a pressure sufficient to create or enhance one or more fractures in a subterranean zone, for example, to stimulate production of fluids from the zone. Notably, in certain instances, the fracturing fluid producing apparatus 20, fluid source 30, and/or proppant source 40 may be equipped with one or more metering devices (not shown) to control the flow of fluids, proppant particles, and/or other compositions to the pumping and blender system 50. Such metering devices may peiinit the pumping and blender system 50 to source from one, some or all of the different sources at a given time, and may facilitate the preparation of fracturing fluids in accordance with the present disclosure using continuous mixing or "on-the-fly" methods. Thus, for example, the pumping and blender system 50 can provide just fracturing fluid into the well at some times, just proppant particles at other times, and combinations of those components at yet other times.

Figure 2:
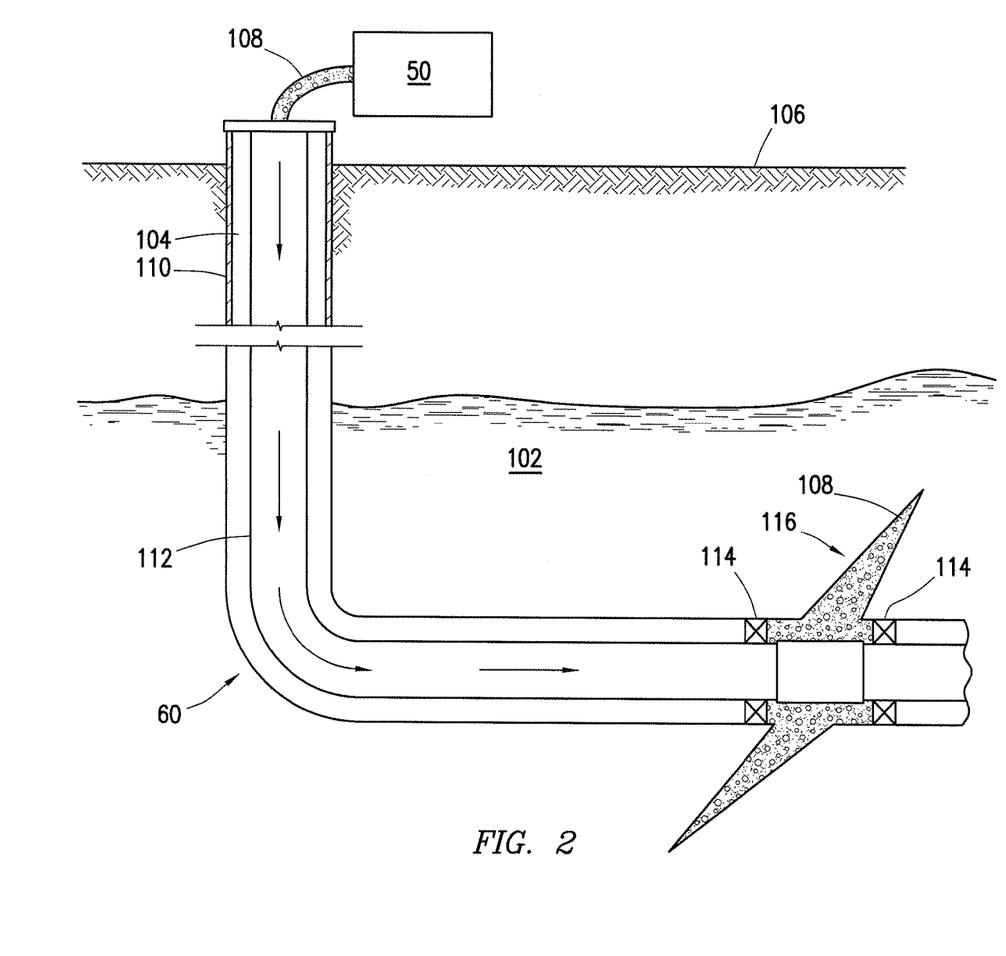
FIG. 2 is a diagram illustrating an example of a subterranean formation in which a fracturing operation may be performed in accordance with certain embodiments of the present disclosure.

FIG. 2 shows the well 60 during a fracturing operation in a portion of a subterranean formation of interest 102 surrounding a wellbore 104. The wellbore 104 extends from the surface 106, and the fracturing fluid 108 is applied to a portion of the subterranean formation 102 surrounding the horizontal portion of the wellbore. Although shown as vertical deviating to horizontal, the wellbore 104 may include horizontal, vertical, slant, curved, and other types of wellbore geometries and orientations, and the fracturing treatment may be applied to a subterranean zone surrounding any portion of the wellbore. The wellbore 104 can include a casing 110 that is cemented or otherwise secured to the wellbore wall. The wellbore 104 can be uncased or include uncased sections. Perforations can be formed in the casing 110 to allow fracturing fluids and/or other materials to flow into the subterranean formation 102. In cased wells, perforations can be formed using shape charges, a perforating gun, hydro jetting and/or other tools.

The well is shown with a work string 112 depending from the surface 106 into the wellbore 104. The pump and blender system 50 is coupled a work string 112 to pump the fracturing fluid 108 into the wellbore 104. The working string 112 may include coiled tubing, jointed pipe, and/or other structures that allow fluid to flow into the wellbore 104. The working string 112 can include flow control devices, bypass valves, ports, and or other tools or well devices that control a flow of fluid from the interior of the working string 112 into the subterranean zone 102. For example, the working string 112 may include ports adjacent the wellbore wall to communicate the fracturing fluid 108 directly into the subterranean formation 102, and/or the working string 112 may include ports that are spaced apart from the wellbore wall to communicate the fracturing fluid 108 into an annulus in the wellbore between the working string 112 and the wellbore wall.

The working string 112 and/or the wellbore 104 may include one or more sets of packers 114 that seal the annulus between the working string 112 and wellbore 104 to define an interval of the wellbore 104 into which the fracturing fluid 108 will be pumped. FIG. 2 shows two packers 114, one defining an uphole boundary of the interval and one defining the downhole end of the interval. When the fracturing fluid 108 is introduced into wellbore 104 (e.g., in FIG. 2, the area of the wellbore 104 between packers 114) at a sufficient hydraulic pressure, one or more fractures 116 may be created in the subterranean zone 102. The proppant particulates (and/or treatment particulates of the present disclosure) in the fracturing fluid 108 may enter the fractures 116 where they may remain after the fracturing fluid flows out of the wellbore. These proppant particulates may "prop" fractures 116 such that fluids may flow more freely through the fractures 116.

While not specifically illustrated herein, the disclosed methods and compositions may also directly or indirectly affect any transport or delivery equipment used to convey the compositions to the fracturing system 10 such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

To facilitate a better understanding of the present disclosure, the following examples of certain aspects of certain embodiments are given. The following examples are not the only examples that could be given according to the present disclosure and are not intended to limit the scope of the disclosure or claims.

Example

Aqueous Base Fluid Composition

In this example, four illustrative treatment fluids were prepared from an aqueous base fluid comprising NF treated Saudi Arabia seawater. The aqueous base fluid before and after NF treatment had properties as shown in Table 1. It should be understood that the aqueous base fluid shown in Table 1 is merely one example of many types of aqueous base fluids that can be used according to the present disclosure.

TABLE 1

| Aqueous base fluid composition | | |
|---|---|---|
| Property | Saudi Arabia Seawater | NF Treated Seawater |
| pH | 7.62 | 7.67 |
| Sodium | 17,950 ppm | 16,267 ppm |
| Potassium | 653.6 ppm | 518.9 ppm |
| Magnesium | 1,958 ppm | 255.5 ppm |
| Calcium | 673.8 ppm | 213.2 ppm |
| Aluminum | 0.55 ppm | 0.2 ppm |
| Iron | 0.9 ppm | 1 ppm |
| Strontium | 1.09 ppm | 2.1 ppm |
| Chloride | 32,826 ppm | 26,105 ppm |
| Boron | 7.73 ppm | 6.55 ppm |
| Barium | 0.8 ppm | 0.1 ppm |
| Carbonate | 34.75 ppm | 16.9 ppm |
| Bicarbonate | 126 ppm | 103 ppm |
| Sulphate | 3,452 ppm | 296 ppm |
| Total Dissolved Salt ("TDS") | 57,671 ppm | 43,398 ppm |
| Oil and Grease | 0.8 ppm | 0.5 ppm |

Treatment Fluid Formulation

In this example, four illustrative treatment fluids were prepared using the NF treated Saudi Arabia seawater described above. Each illustrative treatment fluid comprised different concentrations of carbonate and bicarbonate. However, all four treatment fluids were formulated with a molar ratio of the amount of carbonate to the amount of bicarbonate of about 1:2.5. Table 2 shows the formulations of the treatment fluids as a function of additives to the NF treated Saudi Arabia seawater.

TABLE 2

| Treatment fluid formulation | | | | |
|---|---|---|---|---|
| Additive | Fluid 1 | Fluid 2 | Fluid 3 | Fluid 4 |
| WG-18 ™ | 45 pptg | 45 pptg | 45 pptg | 45 pptg |
| BA-20 ™ | 0.2 gpt | 0.2 gpt | 0.2 gpt | 0.2 gpt |
| BA-40 ™ (carbonate) | 4.5 gpt | 4.0 gpt | 3.0 gpt | 2.5 gpt |
| Gel-Sta L ™ | 4.5 gpt | 4.5 gpt | 4.5 gpt | 4.5 gpt |
| K34 ™ (bicarbonate) | 27 pptg | 24 pptg | 20 pptg | 15 pptg |
| CL-37 ™ | 1.5-2.2 gpt | 1.5-2.2 gpt | 1.5-2.2 gpt | 1.5-2.2 gpt |
| ViCon NF ™ | 1 gpt | 1 gpt | 1 gpt | 1 gpt |
| Molar Ratio $CO_3^{2-}:HCO_3^-$ | 1:2.6 | 1:2.6 | 1:2.8 | 1:2.6 |

The additives listed in Table 2 above are all commercially available from Halliburton Energy Services, Inc., Duncan, Okla. WG-18™ is a gelling agent that is an anionic, low-residue, natural gum derivative. BA-20™ is a buffering agent that is used for hydration. BA-40™ is an alkaline, carbonate-based buffering additive. Gel-Sta L™ is a high-temperature gel stabilizer. K-34™ is a breaker that is a near-neutral, bicarbonate based pH buffering agent. CL-37™ is a crosslinker that is triethanolamine zirconate-based. ViCon NF™ is a water-based gel breaker.

The molar ratio of carbonate to bicarbonate in the treatment fluids was varied by varying the amounts of BA-40™ and K-34™ added to the fluid. The molar ratio of carbonate to bicarbonate in each treatment fluid is listed in Table 2. FIGS. 4A, 4B, 4C, and 4D show the fluid rheological profiles for viscosity vs. time at 330° F. for all four treatment fluids. These rheology tests were performed on a Chandler 5550 rheometer at a constant shear rate of 40 1/s. It will be appreciated by one of skill in the art that the four illustrative treatment fluids of this example show enhanced rheological stability. Attempts to formulate a treatment fluid with similar rheological stability without the molar ratio of carbonate to bicarbonate of about 1:2.5 led to unsuccessful results.

All of these tests were conducted by first hydrating the gelling agent, WG-18™, in high TDS water, then adding the additives as designated in Table 2. Approximately 72 cubic centimeters of the fluid was then placed into the Chandler 5500 rheometer cup with a B2X bob and subjected to a 40 1/s shear rate. The temperature was then increased from room temperature up to a designated temperature of 350° F. over 15 minute period. Viscosity (cP) measurements of the fluid were then taken every 10 seconds for the duration of the test. The resulting viscosity measurements were then plotted versus time in FIGS. 4A, 4B, 4C, and 4D.

Figure 5:
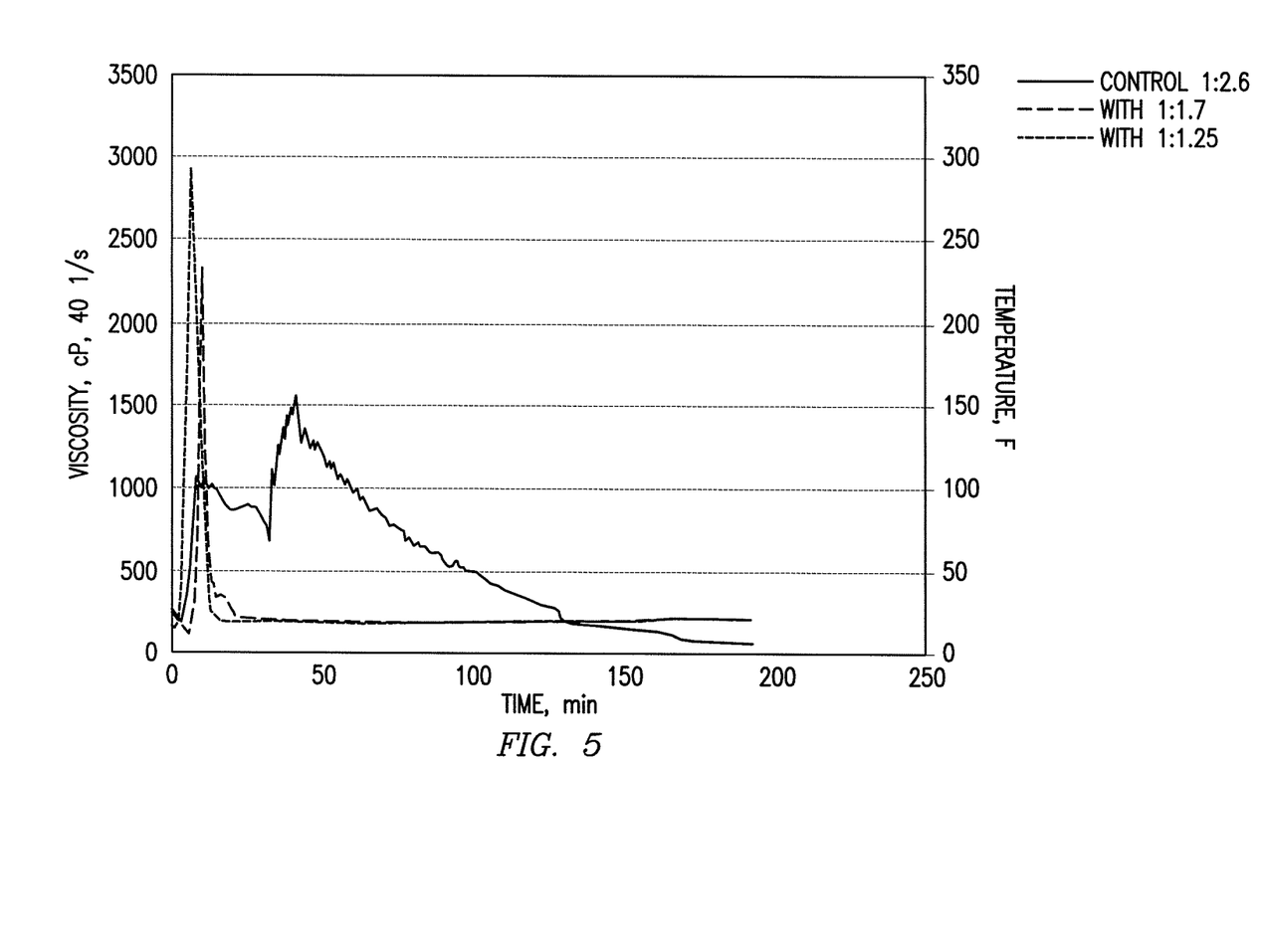
FIG. 5 is a graph illustrating data relating to rheological properties of fluids having varied molar ratios of $CO_3^{2-}$ to $HCO_3^-$, in certain embodiments of the present disclosure.

Three additional treatment fluids were prepared using the NF treated Saudi Arabia seawater described above. Each of these additional treatment fluids were formulated with different molar ratios of the amount of carbonate to the amount of bicarbonate to demonstrate the effect of altering this molar ratio on the rheological properties of the fluid. Table 3 shows the formulations of the additional treatment fluids as a function of additives to the NF treated Saudi Arabia seawater. The same procedure as above was followed to create and test these additional treatment fluids. The results from those tests are shown in FIG. 5.

TABLE 3

Additional treatment fluid formulation

| Additive | Control | Fluid 1 | Fluid 2 |
|---|---|---|---|
| WG-18 ™ | 45 pptg | 45 pptg | 45 pptg |
| BA-20 ™ | 0.2 gpt | 0.2 gpt | 0.2 gpt |
| BA-40 ™ (carbonate) | 5.0 gpt | 5.0 gpt | 5.0 gpt |
| Gel-Sta L ™ | 4.5 gpt | 4.5 gpt | 4.5 gpt |
| K34 ™ (bicarbonate) | 30 pptg | 20 pptg | 15 pptg |
| CL-37 ™ | 2.2 gpt | 2.2 gpt | 2.2 gpt |
| ViCon NF ™ | 1 gpt | 1 gpt | 1 gpt |
| Molar Ratio $CO_3^{2-}$:$HCO_3^-$ | 1:2.6 | 1:1.7 | 1:1.25 |

An embodiment of the present disclosure is a method comprising providing a treatment fluid comprising an aqueous base fluid; a crosslinkable polymer; a crosslinking agent; carbonate; and bicarbonate, wherein the carbonate and the bicarbonate are present in amounts such that the molar ratio of the amount of carbonate to the amount of bicarbonate is in the range of from about 1:2.3 to about 1:2.7; and introducing the treatment fluid into a wellbore penetrating at least a portion of a subterranean formation.

Another embodiment of the present disclosure is a composition comprising an aqueous base fluid; a crosslinkable polymer; a crosslinking agent; carbonate; and bicarbonate, wherein the carbonate and the bicarbonate are present in amounts such that the molar ratio of the amount of carbonate to the amount of bicarbonate is in the range of from about 1:2.3 to about 1:2.7.

Another embodiment of the present disclosure is a method comprising providing a treatment fluid comprising an aqueous base fluid; a crosslinkable polymer; a crosslinking agent; carbonate; and bicarbonate, wherein the carbonate and the bicarbonate are present in amounts such that the molar ratio of the amount of carbonate to the amount of bicarbonate is in the range of from about 1:2.3 to about 1:2.7; and introducing the treatment fluid into a wellbore penetrating at least a portion of a subterranean formation at or above a pressure sufficient to create or enhance one or more fractures in the subterranean formation.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
   providing a treatment fluid comprising:
      an aqueous base fluid;
      a crosslinkable polymer;
      a crosslinking agent;
      carbonate; and
      bicarbonate,
   wherein the carbonate and the bicarbonate are present in amounts such that the molar ratio of the amount of carbonate to the amount of bicarbonate is in the range of from about 1:2.3 to about 1:2.7; and
   introducing the treatment fluid into a wellbore penetrating at least a portion of a subterranean formation.

2. The method of claim 1, wherein the crosslinkable polymer is selected from the group consisting of: locust bean gum, karaya gum, a guar gum, a guar derivative, cellulose, a cellulose derivative, a biopolymer, a starch, a chitosan, a clay, a polyvinyl alcohol, an acrylamide, an acrylate, a viscoelastic surfactant, and any combination thereof.

3. The method of claim 2, wherein the guar derivative is selected from the group consisting of: hydroxyethyl guar, hydroxypropyl guar, carboxymethyl guar, carboxymethylhydroxyethyl guar, carboxymethylhydroxypropyl guar, and any combination thereof.

4. The method of claim 1, wherein the crosslinking agent comprises at least one component that comprises a metal ion selected from the group consisting of: a zirconium IV ion, a titanium ion, an aluminum ion, a borate ion, and any combination thereof.

5. The method of claim 1, wherein the aqueous base fluid comprises sea water.

6. The method of claim 5, wherein the sea water comprises seawater that has been treated by at least one of nanofiltration, electrocoagulation, thermodesalination, or reverse osmosis.

7. The method of claim 1, wherein the portion of the subterranean formation comprises a temperature of from about 250° F. to about 350° F.

8. The method of claim 1, wherein the treatment fluid further comprises one or more additives selected from the group consisting of: a gel stabilizer, a gel breaker, a clay stabilizer, a surfactant, and any combination thereof.

9. The method of claim 1, wherein the treatment fluid further comprises a pH of from about 8.8 to about 9.2.

10. The method of claim 1, wherein the treatment fluid comprises a total dissolved salt value greater than or equal to about 3% by weight of the aqueous base fluid.

11. The method of claim 1, wherein the treatment fluid is introduced into the subterranean formation at a pressure sufficient to create or enhance at least one fracture within the subterranean formation.

12. The method of claim 1, wherein the molar ratio of the amount of carbonate to the amount of bicarbonate is about 1:2.5.

13. A fluid composition comprising:
an aqueous base fluid;
a crosslinkable polymer;
a crosslinking agent;
carbonate; and
bicarbonate,
wherein the carbonate and the bicarbonate are present in amounts such that the molar ratio of the amount of carbonate to the amount of bicarbonate is in the range of from about 1:2.3 to about 1:2.7.

14. The fluid composition of claim 13, wherein the crosslinkable polymer comprises a polymer selected from the group consisting of: locust bean gum, karaya gum, a guar gum, a guar derivative, cellulose, a cellulose derivative, a biopolymer, a starch, a chitosan, a clay, a polyvinyl alcohol, an acrylamide, an acrylate, a viscoelastic surfactant, and any combination thereof.

15. The fluid composition of claim 14, wherein the guar derivative is selected from the group consisting of: hydroxyethyl guar, hydroxypropyl guar, carboxymethyl guar, carboxymethylhydroxyethyl guar, and carboxymethylhydroxypropyl guar.

16. The fluid composition of claim 13, wherein the crosslinking agent comprises at least one component that comprises a metal ion selected from the group consisting of: a zirconium IV ion, a titanium ion, an aluminum ion, a borate ion, and any combination thereof.

17. The fluid composition of claim 13, wherein the fluid composition comprises a pH value in a range of from about 8.8 to about 9.2.

18. The fluid composition of claim 13, wherein the fluid composition comprises a total dissolved salt value greater than or equal to about 3% by weight of the aqueous base fluid.

19. A method comprising:
providing a treatment fluid comprising:
an aqueous base fluid;
a crosslinkable polymer;
a crosslinking agent;
carbonate; and
bicarbonate,
wherein the carbonate and the bicarbonate are present in amounts such that the molar ratio of the amount of carbonate to the amount of bicarbonate is in the range of from about 1:2.3 to about 1:2.7; and
introducing the treatment fluid into a wellbore penetrating at least a portion of a subterranean formation at or above a pressure sufficient to create or enhance one or more fractures in the subterranean formation.

20. The method of claim 19 wherein the treatment fluid is introduced into the well bore using a pump and blender system.

* * * * *